United States Patent [19]
Tsuda et al.

[11] Patent Number: 5,550,664
[45] Date of Patent: Aug. 27, 1996

[54] LIQUID CRYSTAL DISPLAY DEVICE

[75] Inventors: Kazuhiko Tsuda, Tenri; Tokihiko Shinomiya, Nara; Shinji Yamagishi, Osaka, all of Japan

[73] Assignee: Sharp Kabushiki Kaisha, Osaka, Japan

[21] Appl. No.: 360,461

[22] Filed: Dec. 21, 1994

[30] Foreign Application Priority Data

Dec. 24, 1993 [JP] Japan .................. 5-328887

[51] Int. Cl.⁶ ............................. G02F 1/13; G02F 1/133
[52] U.S. Cl. .................... 359/102; 359/103; 359/106; 359/76; 359/78
[58] Field of Search ........................... 359/102, 103, 359/106, 76, 78

[56] References Cited

U.S. PATENT DOCUMENTS

| | | | |
|---|---|---|---|
| 4,367,924 | 1/1983 | Clark et al. | 350/334 |
| 4,697,884 | 10/1987 | Amstutz et al. | 359/75 |
| 4,974,940 | 9/1990 | Asano et al. | 359/102 |
| 5,188,758 | 2/1993 | Baur et al. | 359/103 |

FOREIGN PATENT DOCUMENTS 56-107216A  8/1981  Japan .

WO92/00546  2/1992  WIPO .

*Primary Examiner*—Wael M. Fahmy
*Assistant Examiner*—Fetsum Abraham
*Attorney, Agent, or Firm*—David G. Conlin; Milton Oliver

[57] ABSTRACT

A liquid crystal display device comprising: a pair of substrates disposed in an opposed relation each having an electrode formed in a selected pattern on the opposed surface thereof, and an orientation film formed over the entire opposed surface including the electrode; a liquid crystal layer sandwiched between the substrates; and a driver means for shifting longitudinal molecular axes of the liquid crystal in the liquid crystal layer; said liquid crystal layer comprising a composition of a nematic liquid crystal having a splay elastic constant $K_{11}$ and a twist elastic constant $K_{22}$, and the ratio $K_{11}/K_{22}$ being between which is not greater than 1; in which said nematic liquid crystal has a bistability such that the longitudinal molecular axes thereof are shifted from a first orientation state to a second orientation state within a plane generally parallel with respect to said substrates when a voltage is applied across said electrodes from said driver means, and are kept in the second orientation state when the application of the voltage is stopped.

17 Claims, 7 Drawing Sheets

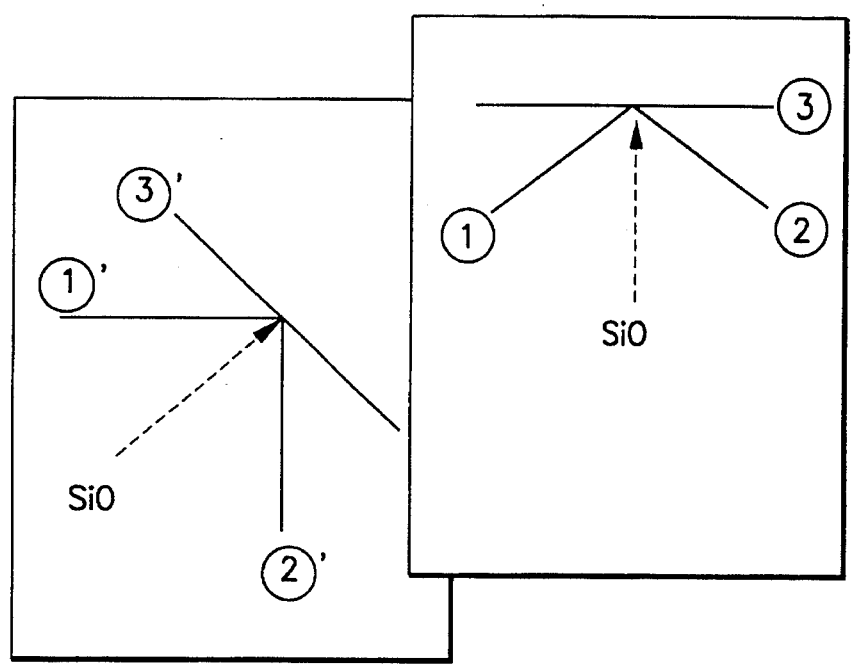
FIG. 8
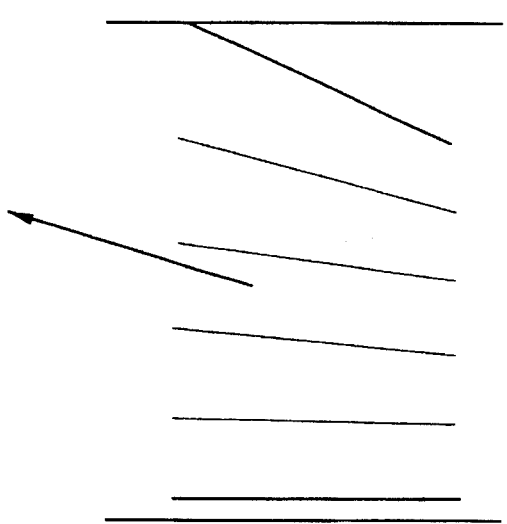
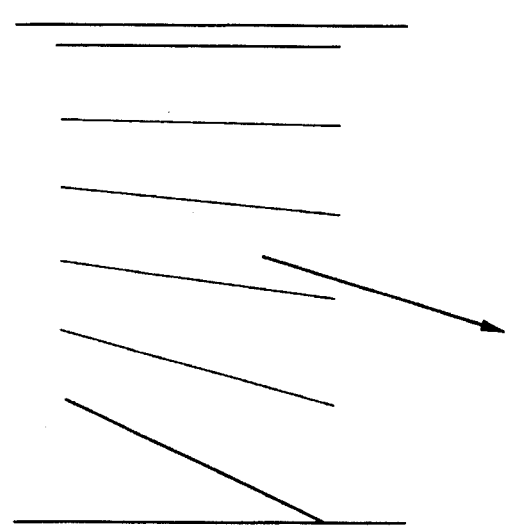
FIG. 9a    FIG. 9b

LIQUID CRYSTAL DISPLAY DEVICE

BACKGROUND OF THE INVENTION

1. Field of the Invention

The present invention relates to liquid crystal display devices and, more particularly, to liquid crystal display devices adapted to bistably switch a nematic liquid crystal. The liquid crystal display devices of the present invention can be applied to display devices fop personal computers, word-processors, television sets, watches, video cameras, and the like.

2. Related Art

In recent years, various types of liquid crystal display devices have been devised with the development of personal computers, word-processors and the like articles. Among them, the most prevailing display modes include twisted nematic (TN) mode and supertwisted nematic (STN) mode. These display modes utilize the optical rotational power of a liquid crystal.

However, the operational principle of these display modes is based on the field effect which utilizes the dielectric anisotropy of liquid crystal molecules, and the switching response time is of the order of several hundreds to several dozens of msec. Accordingly, these display modes cannot provide a response speed fast enough for the applications such as to a CAD terminal which require faster response. In addition, their electro-optical effect is attributed to the switching which utilizes a difference in the refractive index between two states of liquid crystal molecules, i.e., a state where the liquid crystal molecules are oriented parallel to the plane of a substrate and a state where the liquid crystal molecules are oriented upstanding with respect to the plane of the substrate. Hence, the viewing angle dependence is unavoidable due to the operational principle. Further, these display modes do not provide a memory function and, hence, are unsuitable for a large capacity display.

On the other hand, as a liquid crystal display device which provides faster response, N. A. Clark and Lagerwell have proposed a surface stabilized ferroelectric liquid crystal display device (SSFLCD). See Japanese Unexamined Patent Publication No. 58-107218 (1981). The SSFLCD utilizes electrical interaction between a polarity produced by the spontaneous polarization of a smectic liquid crystal and a polarity produced by an electric field to achieve the switching on cones on which liquid crystal molecules are movable. This allows for significantly faster switching than the nematic liquid crystal, and offers an advantage of no viewing angle dependence. However, there still exist some problems, e.g., the layer structure of smectic liquid crystal molecules makes the orientation control difficult, and the orientation once broken by a shock is hardly recoverable.

Georges Durand has proposed a bistable liquid crystal display device using a nematic liquid crystal.

The bistable liquid crystal display device utilizes flexoelectrical polarization developed by orientation distortion as a driving torque for the bistable switching (see PCT Publication No. WO 92/00546). Like the SSFLCD, the application of pulsed electric field switches liquid crystal molecules generally parallel to the plane of a substrate, and the response time of the switching is about 100 µsec. Further, there is no viewing angle dependence, because the liquid crystal molecules are switched in a plane parallel to the plane of the substrate. The use of a nematic liquid crystal eliminates such problems as presented by the SSFLCD, i.e., difficulty in orientation control and lower shock resistance, and provides a wider range of operational temperatures.

In FIG. 6, there is shown the structure of such a nematic bistable display device utilizing flexoelectrical polarization reported by Georges Durand. The display device shown includes glass substrates 11 and 12, liquid crystal layer 13, transparent electrodes 14, SiO orientation films 15 and spacers 16. Each SiO orientation film is deposited to a thickness of 30 Å oblique evaporation at an angle of 74° with respect to the substrate normal, and the diameter of each spacer is about 1 µm to about 3 µm. This condition ensures the stabilization of the orientation C of a liquid crystal molecule perpendicular to the SiO evaporation direction and parallel to the plane of the substrate, as shown in FIG. 7. However, when twist power is generated by the addition of a chiral dopant, two orientations A and B appear in which the liquid crystal molecule is tilted by θ with respect to the plane of the substrate with its projection onto the plane of the substrate being deviated by α° and −α° from the SiO evaporation direction. That is because the anchoring energy between the interface of the orientation film and the liquid crystal molecules is low.

FIG. 8 shows the SiO evaporation direction and the directions in which the liquid crystal molecule can be stably oriented. The directions of the orientation treatment (or SiO evaporation) on the upper and lower substrates are twisted by 45° from the parallel or anti-parallel relation therebetween. The liquid crystal material to be used contains a chiral dopant that allows d/P=1/16 (d:cell distance, P:cholesteric pitch). The twist direction of the liquid crystal orientation is opposite to the twist between the respective SiO evaporation directions on the upper and lower substrates as shown in FIG. 8. The liquid crystal material injected under this condition have stable molecular orientations restricted under the effect of the chiral dopant, which include two stable combinations of ③ to ①' orientation and ② to ③' orientation.

FIGS. 9a and 9b are cross-sectional views of the liquid crystal display device, which correspond to the ② to ③' orientation and ③ to ①' orientation, respectively, shown in FIG. 8. If the molecule of the liquid crystal used in the device has wedge shape, flexoelectrical polarization is developed by a splay-type orientation distortion. The directions of the flexoelectrical polarization are indicated by the arrows in FIGS. 9a and 9b. The vertical components of the flexoelectrical polarization directions shown in FIGS. 9a and 9b have opposite directions. Therefore, the bistable switching between these two states shown in FIGS. 9a and 9b is achieved by reversing the direction of the vertical component of the flexoelectrical polarization by the application of pulsed electric field.

In FIGS. 10 and 11, there are shown pulsed voltage waveforms for simple-multiplexed driving of the above display device. FIG. 10 shows a panel construction of the display device having 3×3 pixels and waveforms of pulsed voltage to be applied for the simple-multiplexed driving. FIG. 11 shows waveforms of the pulsed voltage applied to one pixel. In FIGS. 10 and 11, letters A and B denote excitation pulse voltages and writing pulse voltages, respectively.

With reference to FIGS. 10 and 11, the driving principle will be briefly described below. First, a significantly high excitation pulse voltage is applied to the liquid crystal from a scanning line 1, thereby disanchoring liquid crystal molecules from the interface of the orientation film. Then, a writing pulse voltage is applied from data signal lines. That is, the writing pulse voltage is applied to the liquid crystal molecules disanchored from the interface of the orientation film by the excitation pulse voltage. The direction of the flexoelectrical polarization can be selectively controlled by the polarization of the writing pulse voltage, thereby enabling the selective control of the orientation direction of the liquid crystal molecules. Similarly, the excitation pulse voltage is subsequently applied from scanning lines 2 and 3 to drive the other pixels.

However, the writing pulse voltage applied to selected pixels also serves as a bias voltage to other non-selected pixels. If the effective value of the bias voltage exceeds the dielectric anisotropy threshold of the liquid crystal, the liquid crystal molecules stand up, thereby making the bistable switching impossible.

The conventional bistable liquid crystal display device employing such a liquid crystal composition as Merck's 5CB (cyanobiphenyl-based liquid crystal) required a quiescent period w (=about 23 msec) as shown in FIGS. 10 and 11 to reduce the effective value of the bias voltage when the pulsed voltages of the waveforms shown in FIGS. 10 and 11 were applied to the pixels thereof. From this, it cannot be said that the fast response characteristic inherent to this bistable liquid crystal display device was not fully utilized.

SUMMARY OF THE INVENTION

In accordance with the present invention, there is provided a liquid crystal display device comprising: a pair of substrates disposed in an opposed relation each having an electrode formed in a selected pattern on each opposed surface thereof, and an orientation film formed over the entire opposed surface including the electrode; a liquid crystal layer sandwiched between the substrates; and a driver means for shifting longitudinal molecular axes of the liquid crystal in the liquid crystal layer; said liquid crystal layer comprising a composition of a nematic liquid crystal having a splay elastic constant $K_{11}$ and a twist elastic constant $K_{22}$, and the ratio $K_{11}/K_{22}$ being between which is not greater than 1; in which said nematic liquid crystal has a bistability such that the longitudinal molecular axes thereof are shifted from a first orientation state to a second orientation state within a plane generally parallel with respect to said substrates when a voltage is applied across said electrodes from said driver means, and are kept in the second orientation state when the application of the voltage is stopped.

The liquid crystal display device of the present invention can be driven by way of a simple-multiplexed driving, and does not require a quiescent period for switching.

BRIEF DESCRIPTION OF THE DRAWINGS

FIG. 8 is a schematic representation of the relationship between the direction of SiO evaporation and the orientation of liquid crystal molecules;

FIG. 9 is a schematic representation illustrating the orientation of liquid crystal molecules and the direction of flexoelectrical polarization appearing under that particular condition of the orientation in a cross section of a liquid crystal display device;

DESCRIPTION OF THE PREFERRED EMBODIMENTS

Figure 1:
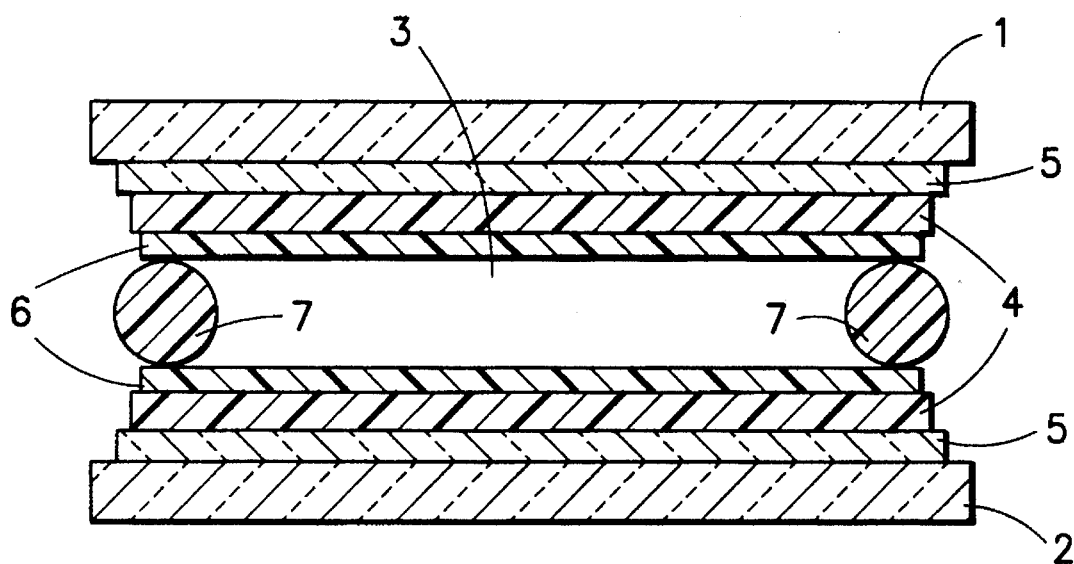
FIG. 1 is a schematic view illustrating a liquid crystal display device according to the present invention.
Figure 6:
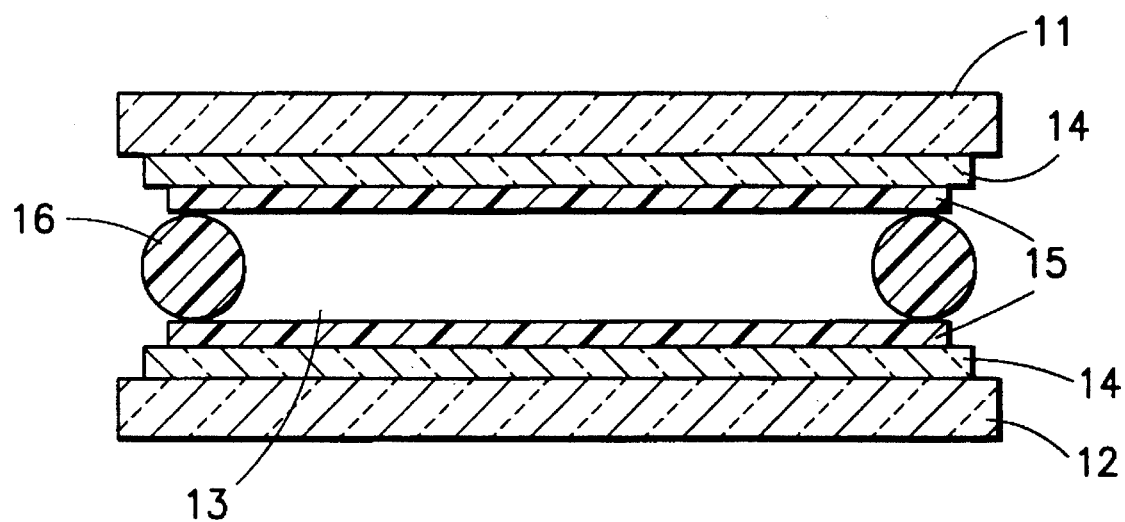
FIG. 6 is a schematic view of a conventional liquid crystal display device.
Figure 2:
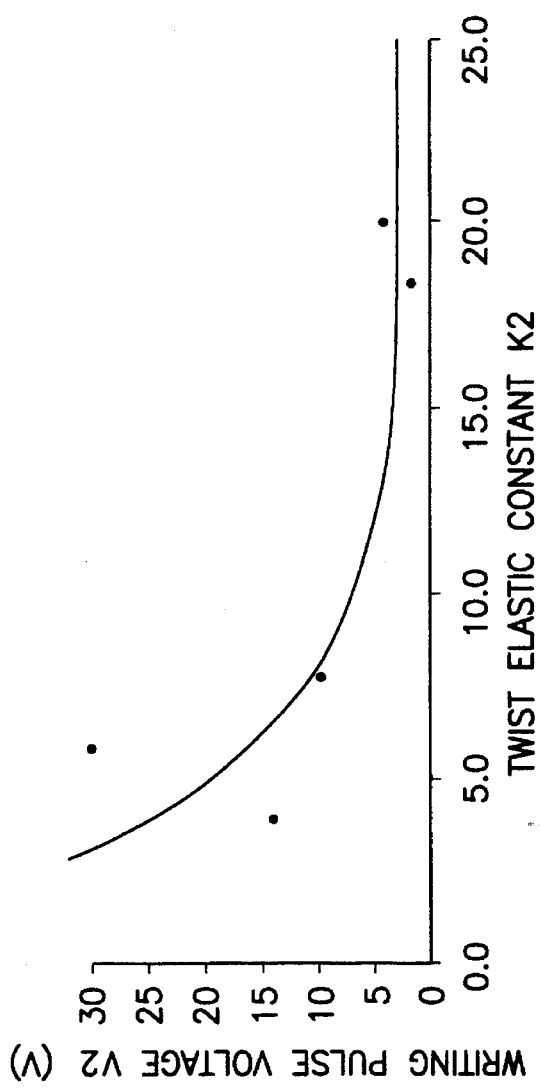
FIG. 2 is a graphic representation of the relationship between the writing pulse voltage and the respective elastic constants ($K_{22}$) of liquid crystal compositions used in EXAMPLEs 1 and 2, and REFERENCE EXAMPLEs 1 to 3.
Figure 3:
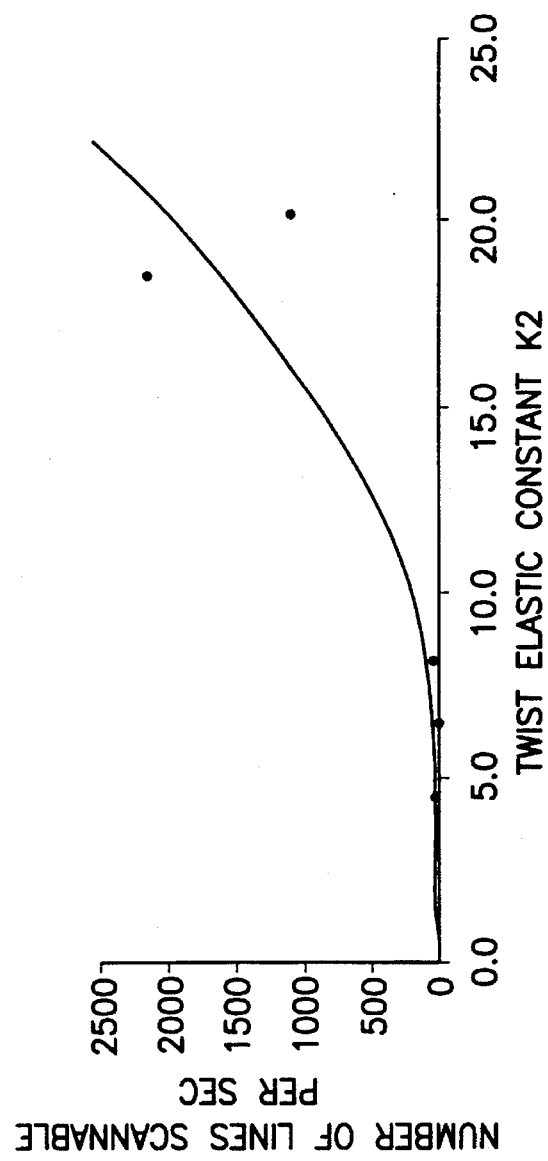
FIG. 3 is a graphic representation of the relationship between the number of lines which can be scanned per one second and the respective elastic constants ($K_{22}$) of liquid crystal compositions used in EXAMPLEs 1 and 2, and REFERENCE EXAMPLEs 1 to 3.
Figure 4:
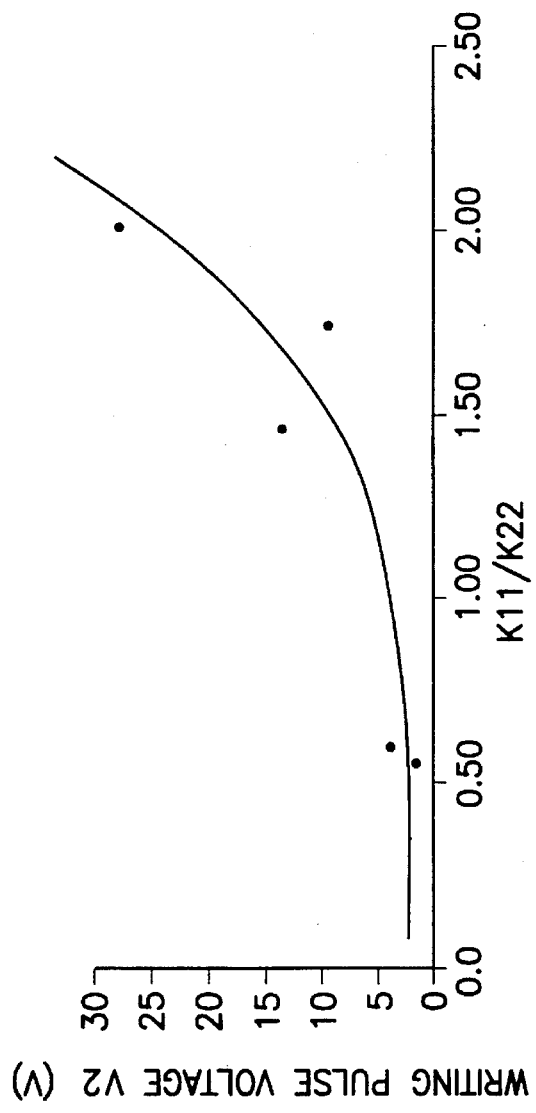
FIG. 4 is a graphic representation of the relationship between the writing pulse voltage and the respective elastic constant ratios ($K_{11}/K_{22}$) of liquid crystal compositions used in EXAMPLEs 1 and 2, and REFERENCE EXAMPLEs 1 to 3.
Figure 5:
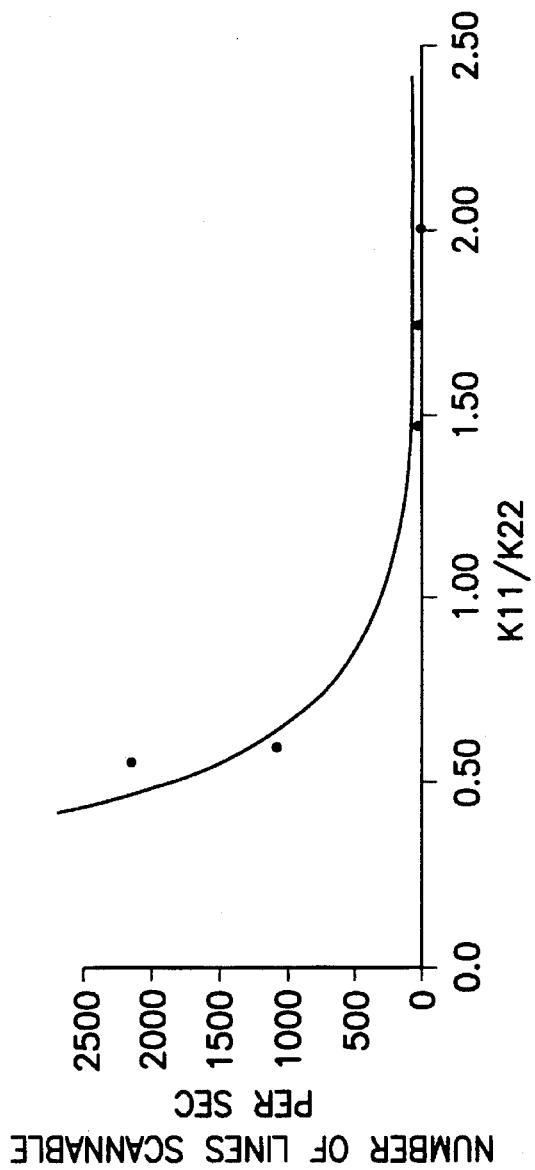
FIG. 5 is a graphic representation of the relationship between the number of lines which can be scanned per one second and the respective elastic constant ratios ($K_{11}/K_{22}$) of liquid crystal compositions used in EXAMPLEs 1 and 2, and REFERENCE EXAMPLEs 1 to 3.
Figure 7:
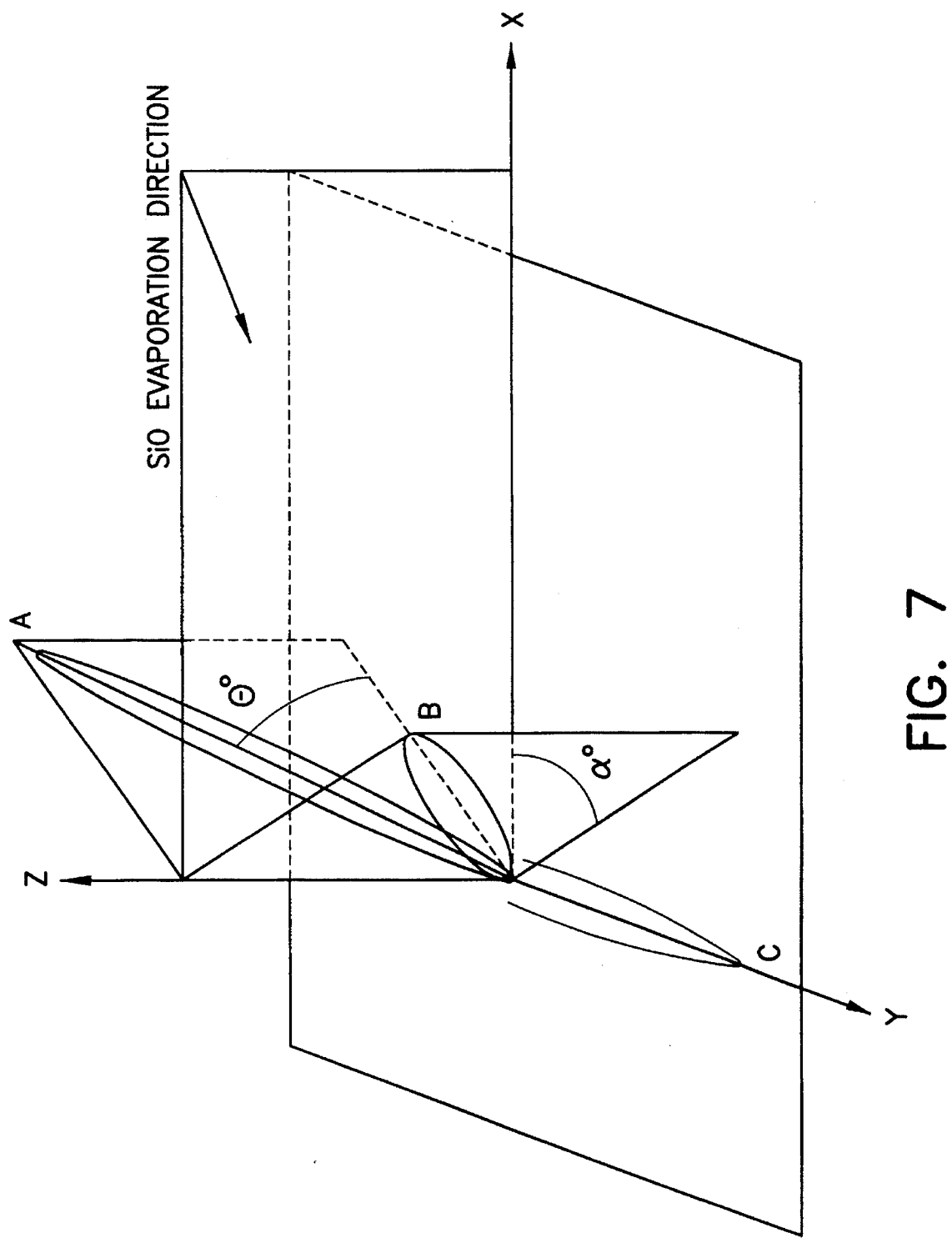
FIG. 7 is a schematic representation illustrating the stable orientation of liquid crystal molecules on an SiO orientation film.

Substrates for use in liquid crystal display devices according to the present invention are transparent insulation substrates of the known type, for example, glass plates, quartz plates and plastic plates. In the case of reflection type liquid crystal display devices, an opaque insulation substrate is used for either one of upper and lower substrates.

On a surface of each of the substrates is formed an electrode in a selective pattern, which comprises a transparent conductive thin film such as made of $InO_3$, $SnO_2$ or ITO (indium tin oxide). The thickness of the electrode can be about 300 Å to about 5000 Å, preferably about 1000 Å to about 3000 Å, and more preferably 1000 Å.

An orientation film is formed on top of the substrate and electrode. The orientation film can be made of either inorganic- or organic-based material. The formation of an inorganic insulation film is preferably achieved by way of SiO oblique evaporation, in which an SiO film with a thickness of about 30 Å to about 150 Å is deposited at an evaporation angle of about 70° to about 80° with respect to the substrate normal by such methods as resistance heating evaporation. Exemplary materials of an organic orientation film include nylon, polyvinylalcohol, polyimide and polystyrene, and the thickness of the film is about 100 Å to about 1000 Å. In general, the organic orientation film is formed by coating the substrate with the organic material and rubbing the surface of the film for an orientation of a certain direction. The orientation treatment can be otherwise achieved by the use of a polymer liquid crystal, Langumuir-Blodgett film, magnetic field or spacer edge.

An optional insulation film may be formed between the orientation film and the electrode formed on the substrate. The formation of the insulation film is intended for the planarization and insulation of the electrode formed in a selected pattern. Examples of such insulation film include inorganic films such as made of $SiO_2$, $SiN_x$ and $Al_2O_3$, and organic films such as made of a polyimide, photoresist resin and polymer liquid crystal. The thickness of the insulation film is about 500 Å to about 5000 Å, preferably about 1000 Å. The inorganic insulation film can be formed by way of epitaxial beam (EB), chemical vapor deposition (CVD), sputtering or evaporation method. On the other hand, the organic insulation film can be formed by applying a solution containing an organic compound or precursor thereof dissolved therein by way of spin- coating, dip-coating, screen-coating or roll-coating, and then curing under predetermined curing conditions (heating or irradiation of light). The organic insulation thin film can be otherwise formed by way of evaporation, sputtering, CVD, or LB method.

The two substrates having the respective orientation films thus formed thereon are bonded together with a sealant so that the orientation films face opposite to each other via spacers. At this time, the orientation treatment direction of one orientation film is twisted preferably by about 0° to about 90°, more preferably by about 45° with respect to a direction parallel or anti-parallel to the orientation treatment direction of the other orientation film. Examples of the spacers include silica beads, but not limited thereto. The diameter of each spacer is about 1 μm to about 5 μm, preferably about 1.2 μm to about 3 μm (which depends on the thickness of the liquid crystal layer). Examples of the sealant to be used include epoxy resins and photo-curable resin, but not limited thereto.

To form the liquid crystal layer, a liquid crystal composition is injected to thus formed liquid crystal display panel. The liquid crystal composition to be used in the present invention contains a nematic liquid crystal having a splay elastic constant $K_{11}$ and a twist elastic constant $K_{22}$, the ratio $K_{11}/K_{22}$ between which is preferably not greater than 1, more preferably between about 0.3 and about 1.

Examples of nematic liquid crystals for use in the present invention include Schiff base type, azo type, azoxy type, benzoate type, biphenyl type, terphenyl type, cyclohexyl carboxylate type, phenylcyclohexane type, pyrimidine type and dioxane type liquid crystals, and multicomponent liquid crystals which are mixtures of the foregoing liquid crystals. More specific examples of liquid crystals include Rodeck's TN-570 and TN-403 which are biphenyl type liquid crystals.

A chiral dopant is added to the nematic liquid crystal to adjust the chiral pitch P of the liquid crystal to $d/P=1/16$ (d:cell thickness). The chiral twist direction is preferably opposite the twist direction between the orientation treatment directions of the orientation films formed on the upper and lower substrates.

Examples of specific chiral dopant include cholesteryl bromide, cholesteryl-n-hexyl ether, cholesteryl benzoate, cholesteryl-n-hexyl heptanate, cholesteryl nonanate, 4-[4- (2-methylbutyl) phenyl] benzoic acid-4'-cyanophenyl ester, t-4-(2-methylbutyl) cyclohexylcarboxylic acid cyanobiphenyl ester, 4-n-hexyloxybenzoic acid-4'-(2-butoxylcarbonyl) phenyl ester, 4-(4'-methylbutyl)-4"-cyano-p-terphenyl, N-(4- ethoxybenzylidene)-4-(2-methylbutyl) aniline, 4-(2-methylbutyl) benzoic acid-4'-n-hexyloxyphenyl ester, 4-n-heptoxy-4'-(2-methylbutyloxycarbonyl) biphenyl, 4-(2-methylbutyl)-4'-carbonylphenyl, 4-[4-(2-methylbutyl) phenyl]benzoic acid-4'-butylphenyl ester. More specific examples of commercially available chiral dopants include Merck's S811 (ester based chiral dopant) and Chisso's CB15 (cyanobiphenyl based chiral dopant).

Compounds other than the chiral dopant can be optionally added to the aforesaid nematic liquid crystal composition. Such compounds are not necessarily required to present a liquid crystalline phase, but include a compound for adjusting the temperature range of the liquid crystalline phase of the prepared liquid crystal composition, and an optically active compound which presents or induces a high spontaneous polarization in a ferroelectric liquid crystalline phase.

The injection of the liquid crystal composition into the liquid crystal display cell is preferably achieved by way of vacuum injection, but not limited thereto.

The orientation of the liquid crystal molecules in the liquid crystal display device is determined by the combination of the anchoring characteristic of the orientation films and the elastic constants of the liquid crystal. As shown in Table 1 (Merck's liquid crystal compositions), the ratios $K_{11}/K_{22}$ (a constant concerning the anisotropy of orientation distortion) of the splay elastic constant to the twist elastic constant of most liquid crystal compositions are within a range between about 1.5 and about 2.5 (for example, 1.5 for 5CB), and the twist elastic constants $K_{22}$ of most liquid crystal compositions are within a range between about 4PN and about 9PN (for example, 4PN for 5CB). These liquid crystal compositions relatively readily assume a twist orientation.

On the other hand, liquid crystal compositions which have elastic constant ratios $K_{11}/K_{22}$ of not greater than 1 and preferably have elastic constants $K_{22}$ of not less than 10PN hardly assume the twist orientation, but readily assume a significantly large splay orientation. Such liquid crystal compositions are considered to develop a high flexoelectrical polarization due to a large splay orientation distortion. By using these liquid crystal compositions, the bistable switching can be realized with a low writing pulse voltage. Accordingly, it is possible to reduce the effective value of the bias voltage applied to non-selected pixels, thereby preventing the orientation of the liquid crystal molecules from being disturbed. As a result, there is provided a display device of a faster bistable switching which requires no quiescent period.

TABLE 1

| ZLI NO. | K11 (pn) | K22 (pn) | K33 (pn) | K11/K22 | ZLI NO. | K11 (pn) | K22 (pn) | K33 (pn) | K11/K22 |
|---|---|---|---|---|---|---|---|---|---|
| 1132 | 10.1 | 5.6 | 19.71 | 1.8 | 3021-100 | 15.3 | 7.5 | 20.3 | 2.0 |
| 1565 | 14.4 | 6.9 | 18.3 | 2.1 | 3054-000 | 14.4 | 7.3 | 20.8 | 2.0 |
| 1557 | 9.5 | 5.1 | 11.5 | 1.9 | 3054-100 | 15.7 | 9.3 | 20.3 | 1.7 |
| 1691 | 10.8 | 5.9 | 22.2 | 1.8 | 3092-000 | 14.0 | 7.5 | 18.6 | 1.9 |
| 1694 | 12.2 | 5.7 | 16.0 | 2.1 | 3092-100 | 14.2 | 7.3 | 19.4 | 1.9 |
| 1800-000 | 9.0 | 5.5 | 14.7 | 1.6 | 3101 | 12.1 | 7.4 | 15.0 | 1.6 |
| 1957 | 11.2 | 5.5 | 12.8 | 2.0 | 3102 | 11.8 | 5.3 | 15.0 | 2.2 |
| 2081 | 10.1 | 5.2 | 11.6 | 1.9 | 3119 | 12.2 | 5.6 | 15.0 | 2.2 |
| 2116-000 | 13.6 | 6.0 | 16.2 | 2.3 | 3125 | 12.5 | 6.6 | 15.0 | 1.9 |

TABLE 1-continued

| ZLI NO. | K11 (pn) | K22 (pn) | K33 (pn) | K11/K22 | ZLI NO. | K11 (pn) | K22 (pn) | K33 (pn) | K11/K22 |
|---|---|---|---|---|---|---|---|---|---|
| 2168-100 | 14.4 | 5.9 | 16.0 | 2.4 | 3145 | 13.1 | 7.0 | 15.7 | 1.9 |
| 2222-100 | 11.5 | 6.2 | 13.2 | 1.9 | 3187 | 13.9 | 6.7 | 18.2 | 2.1 |
| 2231 | 9.5 | 4.7 | 10.6 | 2.0 | 3201-000 | 10.7 | 6.1 | 19.3 | 1.8 |
| 2293 | 12.5 | 7.3 | 17.9 | 1.7 | 3243 | 14.1 | 6.5 | 10.5 | 2.2 |
| 2411 | 9.1 | 6.1 | 14.6 | 1.5 | 3244 | 14.2 | 7.9 | 17.4 | 1.8 |
| 2452 | 15.0 | 8.4 | 20.1 | 1.8 | 3262 | 13.7 | 6.3 | 16.0 | 2.2 |
| 2471 | 13.9 | 8.1 | 15.6 | 1.7 | 3270 | 13.1 | 6.6 | 18.0 | 2.0 |
| 2772 | 13.2 | 7.1 | 16.6 | 1.9 | 3275 | 14.6 | 7.6 | 17.3 | 1.9 |
| 2788-000 | 11.0 | 4.8 | 13.2 | 2.3 | 3276-000 | 11.5 | 5.8 | 16.3 | 2.0 |
| 2788-100 | 11.3 | 5.9 | 12.6 | 1.9 | 3276-100 | 13.6 | 6.1 | 17.3 | 2.2 |
| 2851 | 16.8 | 7.5 | 21.5 | 2.2 | 3279 | 13.2 | 6.8 | 15.2 | 1.9 |
| 2881 | 15.1 | 5.7 | 18.4 | 2.5 | 3285 | 14.1 | 7.0 | 17.4 | 2.0 |
| 2903 | 14.8 | 7.0 | 20.4 | 2.1 | 3329 | 16.4 | 7.2 | 20.8 | 2.3 |
| 2950 | 12.4 | 5.1 | 15.5 | 2.4 | 3417-000 | 11.2 | 6.7 | 16.1 | 1.7 |
|  |  |  |  |  | 3417-100 | 11.6 | 6.6 | 15.8 | 1.8 |
|  |  |  |  |  | 3700-000 | 13.1 | 6.5 | 16.5 | 2.0 |
|  |  |  |  |  | 3700-100 | 13.7 | 7.0 | 16.8 | 2.0 |

EXAMPLES

The present invention will be hereinafter detailed by way of examples, but not limited to such examples.

Example 1

A bistable nematic liquid crystal panel having a cross section of pixels as shown in FIG. 1 was prepared in the following manner.

1. ITO transparent electrodes 5 having a thickness of 1000 Å and a width of 0.2 mm were formed in a striped pattern with a spacing of 0.05 mm on each of glass substrates 1 and 2 by way of MOCVD method. The number of the transparent electrodes 5 was 640×480.
2. An $SiO_2$ insulation film 4 with a thickness of 1000 Å was formed on each of the transparent electrodes 5 for the insulation and planarization of the surface of the substrate by way of EB method.
3. An SiO orientation film 6 with a thickness of 70 Å was deposited at an evaporation angle of 74° on the insulation film 4 formed on each of the substrates 1 and 2 by way of resistance heating evaporation.
4. Silica bead spacers 7 each having a diameter of 2 μm were dispersed between the upper and lower substrates prepared in accordance with the foregoing steps 1 to 3, and the substrates 1 and 2 were bonded together with an epoxy resin sealant so that the SiO evaporation directions of the orientation films formed on the upper and lower substrates were twisted clockwise by 45° from the parallel relation therebetween when projected on the planes of the substrates.
5. A nematic liquid crystal composition (in which 0.25 wt % of a chiral dopant S-811 was blended with Rodeck's TN-570) was injected into the liquid crystal display panel prepared in accordance with the foregoing steps 1 to 4 by way of a vacuum injection technique to form a liquid crystal layer 3. After the injection, the injection opening was sealed with a UV-curable acrylic resin.
6. The liquid crystal display panel prepared in accordance with the foregoing steps 1 to 5 was disposed between two polarization plates (not shown) so that the molecular orientation of the liquid crystal was aligned with the polarization direction of either one of the polarization plates.
7. Pulsed driving voltage of the waveform shown in FIG. 10 was applied to the 640×480 lines of the liquid crystal display panel thus constructed, and the voltage and pulse width of the pulsed voltage which enabled the device to bistably switch was measured. The measurement result is shown in Table 2.

As can be seen from Table 2, it took only 0.45 msec to display one line. Thus, the liquid crystal display panel realized a writing speed of about 2200 lines per one second.

Example 2

A nematic liquid crystal (in which 0.23 wt % of a chiral dopant S-811 was blended with Rodeck's TN-403) was injected into the display panel prepared in the same manner as described in EXAMPLE 1 by way of the vacuum injection. After the injection, the injection opening was sealed with a UV-curable acrylic resin.

Figure 10:
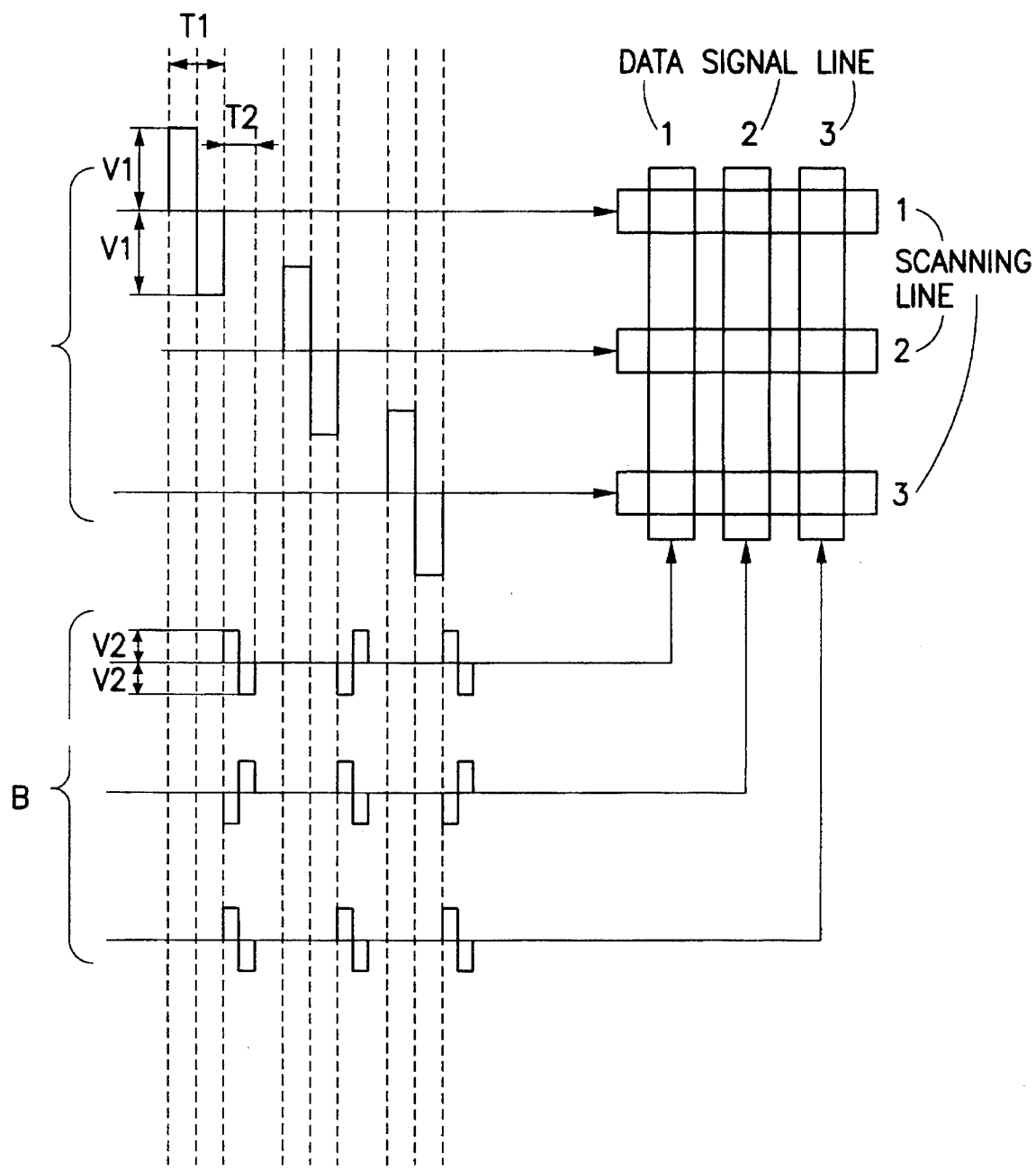
FIG. 10 is schematic representation illustrating the waveforms of applied voltages and a panel construction for the simple-multiplexed driving of 3×3 pixels.
Figure 11:
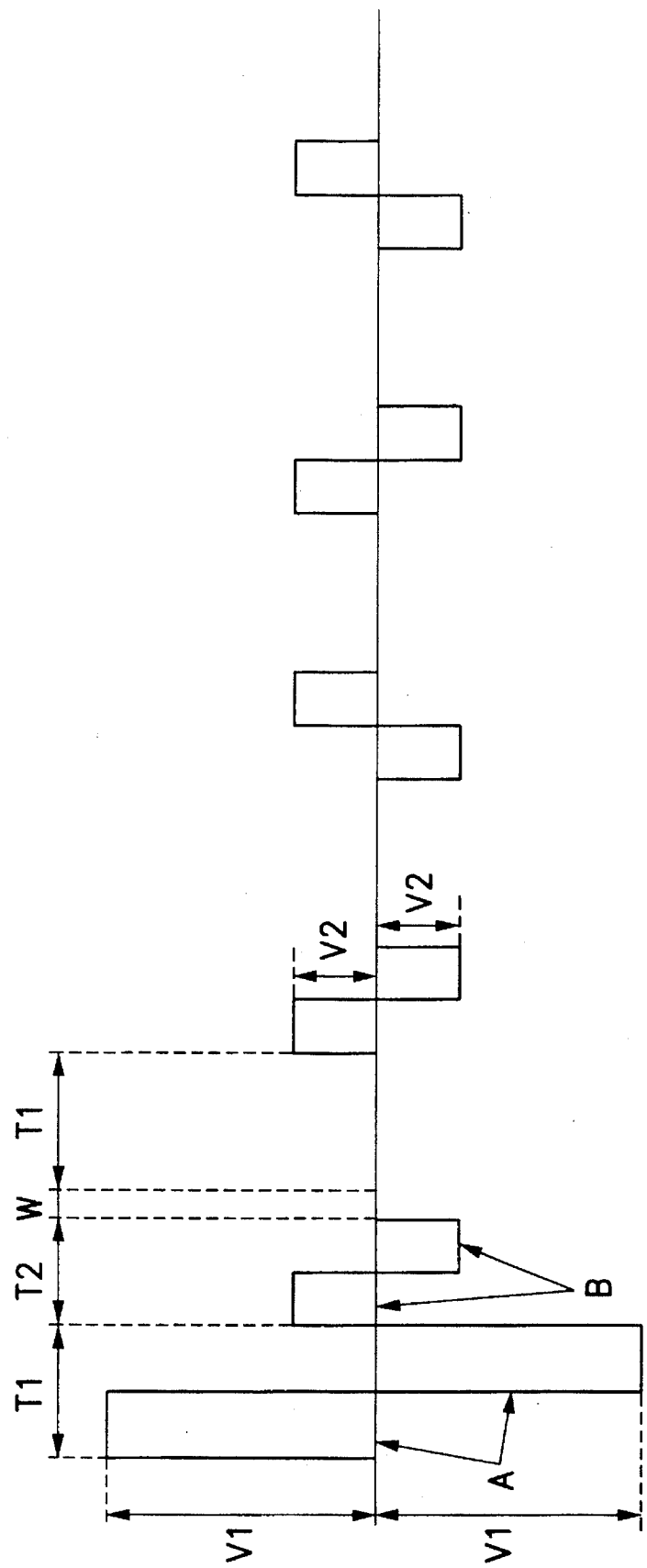
FIG. 11 is a schematic representation illustrating the waveform of pulsed voltage applied to one pixel.

Pulsed driving voltage of the waveform shown in FIG. 10 was applied to the 640×480 lines of the liquid crystal display panel thus constructed, and the voltage and pulse width of the pulsed voltage which enabled the device to bistably switch was measured. The measurement result is shown in Table 2.

As can be seen from Table 2, it took only 0.9 msec to display one line. Thus, the liquid crystal display panel realized a writing speed of about 1100 lines pep one second.

REFERENCE EXAMPLE 1

A nematic liquid crystal (in which 0.2 wt % of a chiral dopant S-811 was blended with Merck's 5CB) was injected into the display panel prepared in the same manner as described in EXAMPLE 1 by way of the vacuum injection. After the injection, the injection opening was sealed with a UV-curable acrylic resin.

Pulsed driving voltage of the waveform shown in FIG. 10 was applied to the 640×480 lines of the liquid crystal display panel thus constructed, and the voltage and pulse width of the pulsed voltage which enabled the device to bistably switch was measured. The measurement result is shown in Table 2.

As can be seen from Table 2, it took 30 msec to display one line, i.e., the writing speed was only 30 lines per one second.

REFERENCE EXAMPLE 2

A nematic liquid crystal (in which 0.2 wt % of a chiral dopant S-811 was blended with Merck's ZLI-3244) was injected into the display panel prepared in the same manner as described in EXAMPLE 1 by way of the vacuum injection method. After the injection, the injection opening was sealed with a UV-curable acrylic resin.

Pulsed driving voltage of the waveform shown in FIG. 10 was applied to the 640×480 lines of the liquid crystal display panel thus constructed, and the voltage and pulse width of the pulsed voltage which enabled the device to bistably switch was measured. The measurement result is shown in Table 2.

As can be seen from Table 2, it took 20 msec to display one line, i.e., the writing speed was only 50 lines per one second.

REFERENCE EXAMPLE 3

A nematic liquid crystal (in which 0.2 wt % of a chiral dopant S-811 was blended with Merck's ZLI-3238) was injected into the display panel prepared in the same manner as described in EXAMPLE 1 by way of the vacuum injection method. After the injection, the injection opening was sealed with a UV-curable acrylic resin.

Pulsed driving voltage of the waveform shown in FIG. 10 was applied to the 640×480 lines of the liquid crystal display panel thus constructed, and the voltage and pulse width of the pulsed voltage which enabled the device to bistably switch was measured. The measurement result is shown in Table 2.

As can be seen from Table 2, the writing speed was only one line per one second.

The measurement results of the foregoing EXAMPLEs 1 and 2, and REFERENCE EXAMPLEs 1 to 3 are graphically represented in FIGS. 2 to 5. As can be understood therefrom, the liquid crystal display device does not require a quiescent period for switching, if the ratio $K_{11}/K_{22}$ of the splay elastic constant $K_{11}$ to the twist elastic constant $K_{22}$ is not greater than 1.

As can be seen from the foregoing, the bistable nematic liquid crystal display device of the present invention comprises a pair of substrates disposed in an opposed relation each having an electrode formed in a selected pattern on the opposed surface thereof and an orientation film formed over the entire opposed surface including the electrode and treated by way of an orientation treatment, a layer of a liquid crystal sandwiched between the substrates, and a driver means for shifting the longitudinal molecular axes of the liquid crystal in the liquid crystal layer. The liquid crystal has a bistability such that the longitudinal molecular axes thereof are shifted from a first orientation state to a second orientation state within a plane generally parallel with respect to said substrates when a voltage is applied across the electrodes from the driver means, and are kept in the second orientation state when the application of the voltage is stopped. The liquid crystal layer is formed of a composition of a nematic liquid crystal having a splay elastic constant $K_{11}$ and a twist elastic constant $K_{22}$, the ratio $K_{11}/K_{22}$ between which is not greater than 1. The bistable nematic liquid crystal display device thus constructed can be driven by way of a simple-multiplexed driving, and does not require a quiescent period for switching.

What is claimed is:

1. A liquid crystal display device comprising:

a pair of substrates disposed in an opposed relation each having an electrode formed in a selected pattern on the opposed surface thereof, and an orientation film formed over the entire opposed surface including the electrode;

a liquid crystal layer sandwiched between the substrates; and a driver means for shifting longitudinal molecular axes of the liquid crystal in the liquid crystal layer;

said liquid crystal layer comprising a composition of a nematic liquid crystal having a splay elastic constant $K_{11}$ and a twist elastic constant $K_{22}$, and the ratio $K_{11}/K_{22}$ being said constants being not greater than 1;

in which said nematic liquid crystal has a bistability such that the longitudinal molecular axes thereof are shifted from a first orientation state to a second orientation state within a plane generally parallel with respect to said substrates when a voltage is applied across said electrodes from said driver means, and are kept in the second orientation state when the application of the voltage is stopped.

2. A liquid crystal display device as set forth in claim 1, wherein the ratio $K_{11}/K_{22}$ of the splay elastic constant $K_{11}$ to the twist elastic constant $K_{22}$ is about 0.3 to about 1.

3. A liquid crystal display device as set forth in claim 1, wherein the twist elastic constant $K_{22}$ of said nematic liquid crystal is not less than 10PN.

4. A liquid crystal display device as set forth in claim 1, wherein an orientation of one orientation film is twisted by 0° to about 90° with respect to a direction parallel or antiparallel to an orientation of the other orientation film.

TABLE 2

| Liquid crystal | Properties of liquid crystals | | | | Driving characteristics | | | | | |
|---|---|---|---|---|---|---|---|---|---|---|
| | Δε | k1 (pK) | k2 (pK) | k1/k2 | V1 (v) | V2 (v) | T1 (msec) | T2 (msec) | W (msec) | L/S (l/sec) |
| TN-570 | 13.9 | 10.7 | 18.5 | 0.58 | 30 | 1.5 | 0.4 | 0.05 | 0 | 2200 |
| TN-403 | 19.2 | 12.6 | 20.2 | 0.62 | 30 | 4 | 0.8 | 0.1 | 0 | 1100 |
| 5CB | 13.0 | 8.0 | 4.0 | 1.50 | 20 | 14 | 1.0 | 1.0 | 28 | 30 |
| ZLI-3244 | 5.5 | 14.2 | 7.9 | 1.79 | 50 | 10 | 1.0 | 1.0 | 18 | 50 |
| ZLI-3238 | 15.0 | 12.3 | 6.0 | 2.06 | 30 | 30 | 1.0 | 1.0 | — | 1 |

5. A liquid crystal display device as set forth in claim 1, wherein said nematic liquid crystal is selected from the group consisting of Schiff base type, azo type, azoxy type, benzoate type, biphenyl type, terphenyl type, cyclohexylcarboxylate type, phenylcyclohexane type, pyrimidine type and dioxane type liquid crystals, and mixtures thereof.

6. A liquid crystal display device as set forth in claim 5, wherein said nematic liquid crystal is a biphenyl type liquid crystal.

7. A liquid crystal display device as set forth in claim 6, wherein said biphenyl type liquid crystal is RODECK TN-570 or RODECK TN-403.

8. A liquid crystal display device as set forth in claim 7, wherein the biphenyl type liquid crystal is doped with about 0.25 wt % of a chiral dopant.

9. A liquid crystal display device as set forth in claim 6, wherein the biphenyl type liquid crystal is doped with about 0.25 wt % of a chiral dopant.

10. A liquid crystal display device as set forth in claim 9, wherein the chiral dopant is an ester-based chiral dopant.

11. A liquid crystal display device as set forth in claim 10, wherein the dopant is MERCK S-811.

12. A liquid crystal display device as set forth in claim 9, wherein the chiral dopant is a cyandbiphenyl-based chiral dopant.

13. A liquid crystal display device as set forth in claim 12, wherein the dopant is CHISSO CB15.

14. A liquid crystal display device as set forth in claim 1, wherein the orientation of the orientation film is tilted by about 70° to about 80° with respect to a substrate normal.

15. A liquid crystal display device as set forth in claim 1, wherein said liquid crystal layer has a thickness of about 1 μm to about 5 μm.

16. A liquid crystal display device as set forth in claim 15, wherein said liquid crystal layer has a thickness of about 1.2 μm to about 3 μm.

17. A liquid crystal display device as set forth in claim 1, wherein the thickness of said liquid crystal layer and the chiral pitch of said liquid crystal satisfy the relation:

$$d/P = 1/16$$

where P and d represent the chiral pitch of the liquid crystal and the thickness of the liquid crystal layer, respectively.

* * * * *